Figure 1:
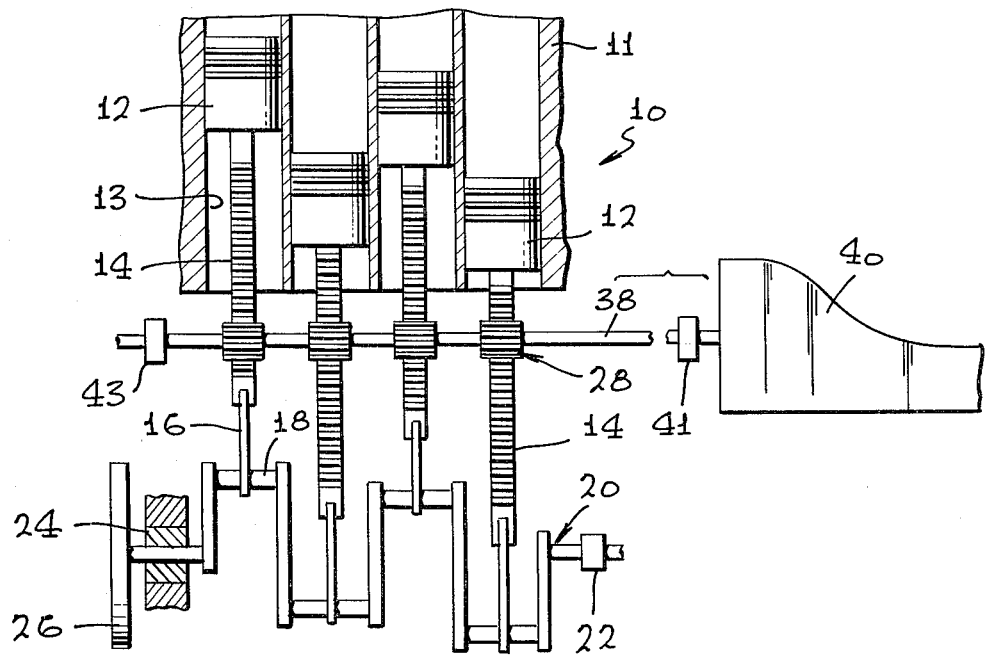

United States Patent [19]

Shin

[11] 4,433,649
[45] Feb. 28, 1984

[54] ENGINE

[76] Inventor: Hi B. Shin, 3635 W. 225th Torrance, Calif. 90505

[21] Appl. No.: 325,117

[22] Filed: Nov. 27, 1981

[51] Int. Cl.³ .................... F02B 75/26; F16H 21/22
[52] U.S. Cl. .................... 123/54 R; 74/44; 74/130; 123/197 C; 123/52 A
[58] Field of Search ............ 123/54 R, 54 A, 52 A, 123/54 B, 197 R, 197 AB, 197 AC, 197 C; 74/44, 128, 130

[56] References Cited

U.S. PATENT DOCUMENTS

| Re. 16343 | 5/1926 | Powell | 123/54 R |
|---|---|---|---|
| 533,290 | 1/1895 | Gray | 123/54 B |
| 1,466,394 | 8/1923 | Fornaca | 123/197 C |
| 1,512,879 | 10/1924 | Corniere | 123/197 C |
| 3,861,222 | 1/1975 | Braun et al. | 74/44 |

FOREIGN PATENT DOCUMENTS 502989  3/1939  United Kingdom ............... 74/44

Primary Examiner—Craig R. Feinberg
Attorney, Agent, or Firm—Julius L. Rubinstein

[57] ABSTRACT

An internal combustion engine has a piston rack depending from each piston. This rack is connected to a power output shaft through a mechanical rectifier so that the power output shaft rotates in only one direction. A connecting rod is pivotally connected at one end to the rack and at the other end to the crank of a reduced function crankshaft so that the crankshaft rotates at the same angular velocity as the power output shaft and at the same frequency as the pistons. The crankshaft has a size, weight and shape sufficient to return the pistons back into the cylinders in position for the next power stroke.

2 Claims, 4 Drawing Figures

ENGINE

BACKGROUND AND PRIOR ART

In the ordinary internal combustion engine and in some steam engines, the alternating rectilinear movement of the pistons is transformed into rotary motion by means of connecting rods connected to a crankshaft.

This arrangement is somewhat inefficient because the angle between the connecting rod and the crank of the crankshaft is generally far from 90° at the moment of cylinder detonation. In fact, the connecting rod and the crankshaft may almost be in alignment at that time. Consequently, the torque that the piston is able to exert on the crank of the crankshaft at the moment of detonation is minimal. Although this system is generally conservative, some energy loss occurs as a result of this near alignment of the connecting rod and crank, which results in some loss of efficiency.

For engines having the same cubic inches, a small diameter piston offers greater burning efficiency because the force of the exploding gasses is distributed more evenly over the surface of the piston. However, this improvement is off-set in the conventional engine by the long piston stroke required to obtain the same cubic inches. This long stroke requires a longer crank in the crankshaft, which is less efficient.

If the pistons had a larger diameter, the stroke of the pistons would be smaller, so that the crank of the crankshaft would be shorter and more efficient. However, this greater efficiency is offset by the fact that the exploding gasses in the cylinders at detonation would be distributed less evenly over the surface of the piston.

A rack and pinion connected between the pistons and the drive shaft, wherein the alternating movement of the pistons is transformed into a rotary movement by means of a mechanical rectifier permits the design of a long stroke engine with small area pistons and a reduced function crankshaft in order to improve the efficiency of the engine.

In the past, many efforts were made to design internal combustion engines with a rack and pinion arrangement for the transfer of power to the transmission, in place of the conventional connecting rod and crankshaft arrangement. But these prior efforts were not commercially successful in the era of low cost fuel, because the energy savings then were unimportant. Now, however, the increased cost of energy has generated renewed interest in the rack and pinion connected between the pistons and drive shaft because even a small increase in engine efficiency may be economically attractive.

Heretofore mechanisms for transforming alternating piston motion into a uni-directional rotary motions were expensive and complicated. For example, the patent to Stenz, U.S. Pat. No. 1,026,184, teaches the use of sectored gearing for the transmission of reciprocating movement and the avoidance of crankshafts with consequent dead points. (See column 1, lines 7-15 therein.)

The patent to Flood, U.S. Pat. No. 1,316,437, utilizes a rack and pinion in an arrangement which eliminates the need for a crankshaft, connecting rods and the like. In Flood, a spur gear engages the upper teeth of a sliding gear in one direction and the lower teeth of the sliding gear in the opposite direction to provide uni-directional rotary motion.

The patent to Powell, U.S. Pat. No. 1,545,516, is designed to prevent an engine from being at dead center at any time during the firing stroke. This is achieved through the use of a differential movement between the crank members and the crankshaft and the piston rod.

The patent to McClurkin, U.S. Pat. No. 1,827,248, discloses a piston with an internal rack and pinion arrangement attached thereto, arranged somewhat like the Flood patent, supra. The orbital movement of the rack permits the pinion to rotate in one direction.

The U.S. Pat. No. to Latil, 2,155,497, discloses a piston in an internal combustion engine, wherein a rack secured to a piston meshes with a sectored pinion which drives the main engine shaft. A connecting rod is secured at one end to the lower end of the rack and at the other end to the crank of a crankshaft. The crankshaft is driven by a system of gears at a speed twice that of the power output shaft to cause proper meshing of the sectored pinions with the upper tooth of the rack at the time of piston detonation.

The patent to Brezenski, U.S. Pat. No. 2,088,504, converts reciprocating movement to rotary movement by a programmed disengagement of the rack bar from the pinion on the piston up-stroke.

The U.S. Pat. No. to Dillenback, 2,239,663, utilizes ratchet gears which mesh with ratchet bars in one direction and which are disengaged from the ratchet gears in another direction to achieve rotary motion. (See FIG. 8.)

The patent to Julin, U.S. Pat. No. 2,337,330, teaches the use of racks and gears and segmental gear wheels which alternately engage the pinion as the pistons rise and fall. The segmental gears are connected to a common gear to provide uni-directional rotary motion.

The patent to Julin, U.S. Pat. No. 2,757,547, is somewhat similar to U.S. Pat. No. 2,337,330, and achieves rotary motion by disconnecting a driven shaft from the drive shaft through the use of segmental gears which alternately connect the driveshafts to the driven shafts.

All the above described patents disclose rather complex mechanisms and result in an engine which is large, heavy and expensive.

Applicant has achieved a useful decrease in engine complexity, size and weight, in an internal combustion engine having a rack and pinion arrangement by reducing the function of the crankshaft.

In this case, the power output function of the crankshaft is removed from the crankshaft, and the crankshaft which rotates at the same speed as the power output shaft is used to provide a flywheel function and to control the timing. In this way, power losses inherent in the long stroke piston movements is reduced because the crankshaft does not deliver power.

In addition, as will be seen, the present arrangement provides an automatic free-wheeling effect because if the engine drive shaft were rotating at a speed greater than the rotational speed of the mechanical rectifier, the mechanical rectifier and the pistons and piston rack will be disconnected from the engine drive shaft, even during the down or power stroke. With this arrangement, if the engine were installed in an automobile, moving at a high rate of speed, the engine would not be a drag on the velocity of the car if the driver of the car takes his foot off the gas. It would be as though at high rates of speed, the car is put in neutral. In contrast, at lower speeds, when the rotational speed of the power output shaft is less than the rotational speed of the mechanical rectifier, this effect would not occur. This results in a greater savings of energy at high engine speeds, and this effect is achieved without the use of additional parts, because it is inherent in this engine design.

Moreover, the rack and pinion arrangement also transmits torque to the pinion at 90° during the entire piston stroke, which results in somewhat greater efficiency, thereby producing a smoother and more efficient running engine.

What is needed, therefore, and comprises an important objective of this invention is to provide a rack and pinion mechanism for engines of a kind where the pinion drives the power output shaft and which is simple to construct and which results in a more compact, lightweight engine.

A further objective of this invention is to provide an internal combustion engine or steam engine which utilizes a rack and pinion to drive a power output shaft and wherein the function of the crankshaft is reduced so that it only has to return the pistons to the proper position in the cylinders in position for the next power stroke.

These and other objectives of this invention will become more apparent when better understood in the light of the accompanying drawings and specifications wherein:

FIG. 1—is a sectional view of the engine showing the racks attached to the pistons and the gearing which drives the power output shaft attached to the transmission.

Figure 2:
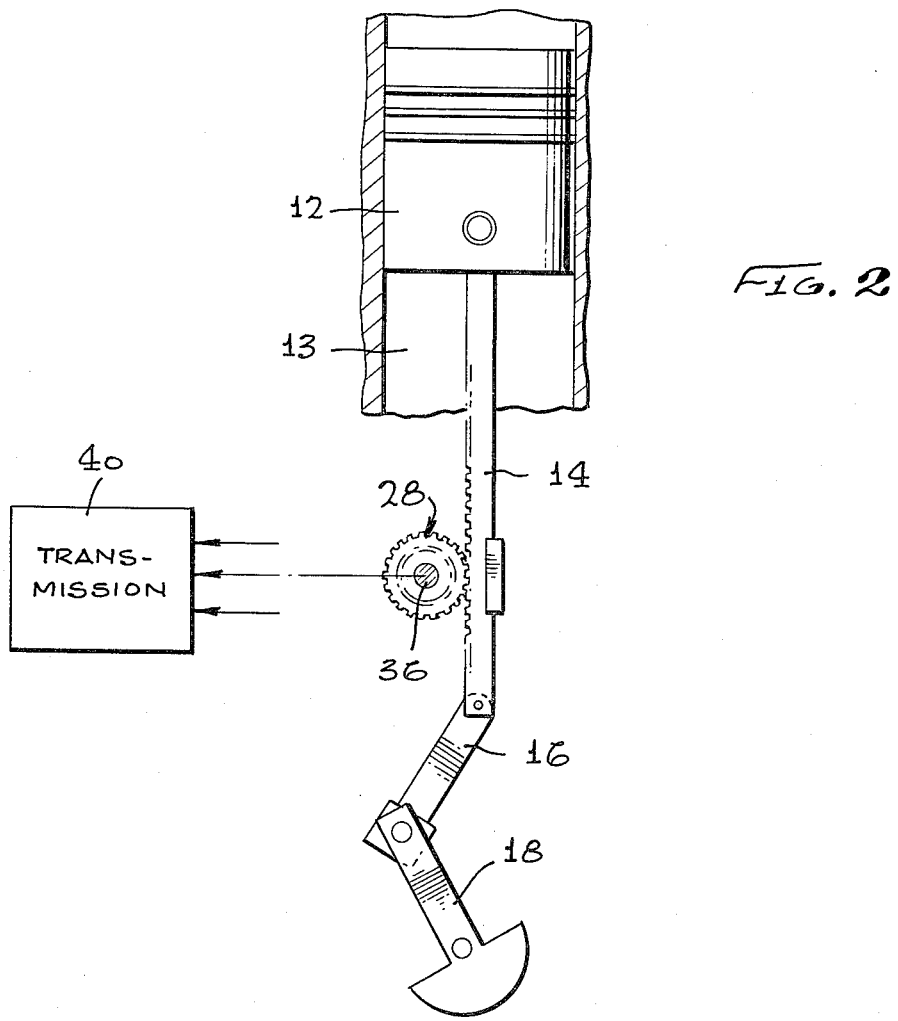

FIG. 2—is a sectional view taken on the line 2—2 of FIG. 1.

Figure 3:
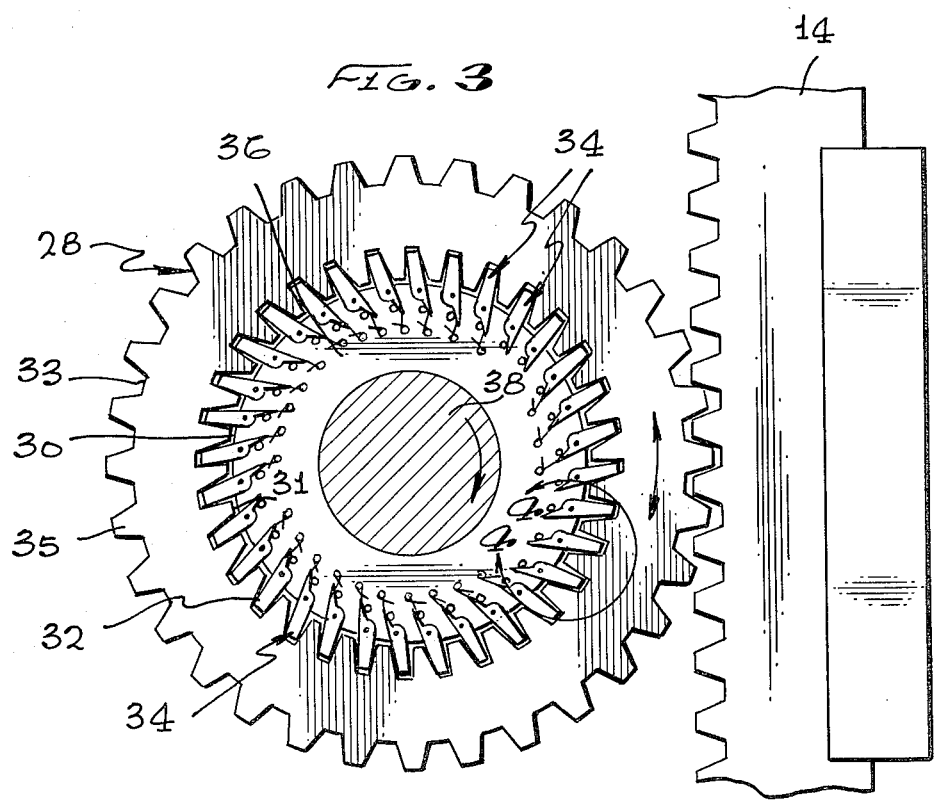

FIG. 3—is a side-elevational view of the pinion gearing, showing the mechanical rectifier function between the outer gear and the concentrically mounted ratchet pinion.

Figure 4:
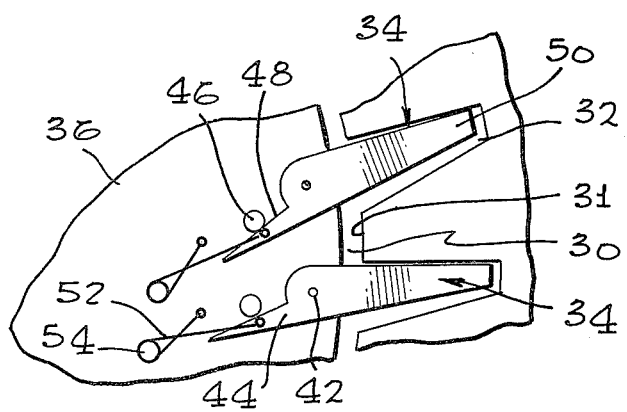

FIG. 4—is an enlargment of the gear and pinion taken in the region 4—4 of FIG. 3.

Referring now to FIG. 1 of the drawing, an engine, such as a steam engine or an internal combustion engine, indicating generally by the reference 10, comprises an engine block 11, and at least one and usually a plurality of piston receiving cylinders 13 formed in the engine block 11. A piston 12 is mounted in each cylinder for alternating rectilinear movement in a manner well known in the art. Each piston has a downwardly extending rack 14 secured to its lower end. A connecting rod 16 is pivotally connected at one end to the lower end of the rack and at the opposite end to the crank 18 of the crankshaft 20. This simple connection causes the crankshaft to rotate at the same speed as the power output shaft 38, for reasons to be described below. The crankshaft is mounted in bearings 22 and 24 and a flywheel 26 is mounted on the end of the crankshaft.

Each rack 14 meshes with a gear 28. With this arrangement as the pistons rise and fall in the cylinders of the engine, gears 28 rotate first in one direction and then in the opposite direction, see FIG. 2.

Each gear 28 has a generally concentric opening 30 extending therethrough defining an inner peripheral surface 31 and an outer peripheral surface 33 on which the gear teeth 35 are formed. (See FIGS. 3 and 4.) The inner surface 31 of the gear 28 in this particular embodiment is provided with uniformly angulary spaced radially extended ratchet teeth receiving openings 32 for receiving ratchet teeth 34. (See FIG. 4.)

These ratchet teeth are pivotally mounted on the outer surface of the ratchet pinion 36 (see FIG. 3). The ratchet pinion which is rigidly secured to the power output shaft 38 is mounted in said circular opening 30 so that the resulting engine will be more compact and lighter. The power output shaft is connected to the power output train or transmission 40 and is supported in bearings 41 and 43.

The ratchet teeth 34 are pivotally mounted on ratchet pinion 36 by means of a pivot pins 42 mounted thereon. (See FIG. 4.) Each ratchet tooth has a tail portion 44 which is provided with an abutting surface 48 which is designed to engage a stop pin 46 mounted on the surface of the ratchet pinion 36. A spring 52 associated with each ratchet tooth is mounted on a pin 54 attached to the ratchet pinion 36. A portion of each spring engages tail portion 44 of each ratchet tooth 34 so that it biases each ratchet tooth in the clockwise direction toward the stop 46. The front portions 50 of each ratchet tooth 34, in this particular embodiment, extend inside the openings 32 formed in the inner-peripheral surface 31 surrounding the circular opening 30 of the gear 28. (See FIG. 4.) It is understood, however, that it may be possible for the inner peripheral surface 31 of gear 28 to be without teeth receiving recesses and for the ratchet teeth 34 to be mounted so a modified front portion 50 pushes against the inner peripheral surface 31 of the gear 28 in one direction but not in the opposite direction, relying thereby on the frictional engagement of the front portion of the ratchet teeth with said inner peripheral surface 31 for the power transmission.

With this arrangement, as seen in FIG. 4, when gear 28 rotates in the counter-clockwise direction, the ratchet teeth are pivoted in a counter-clockwise direction which moves the tail portion 44 of the ratchet teeth 34 away from stop pin 46 so the ratchet teeth can pivot out of opening 32 and out of engagement with the inner peripheral surface 31 of the gear 28. With this arrangement, the rotary motion of gear 28 would not be transmitted to the ratchet pinion 36. This corresponds to the piston up-stroke. However, when the gear 28 rotates in the clockwise direction, the springs 52 rotate the ratchet teeth back into the openings 34 and the movement of the gear 28 in that direction presses surface 48 of the tail 44 of each ratchet tooth against the stops 46 so the ratchet teeth cannot pivot further in a clockwise direction. With this arrangement, further rotation of the gear 28 drives the ratchet pinion 36 in the same clockwise direction. This corresponds to the dowward power stroke of the pistons. This rotary motion of the ratchet pinion is transmitted to the power output shaft 38 which is connected to the power train or transmission of the engine.

Since the crankshaft 20 is not connected to the transmission, power losses connected by a near alignment between connecting rod 16 and the crank 18 at the time of cylinder detonation or power stroke is minimized. Furthermore, as stated above, the engagement between the rack 4 and gear 28 is always at 90°, so that losses in the power transmission from the pistons to the power output shaft is minimized. Moreover, the crankshaft 20 and the support bearings 22 and 24 can be lighter and smaller than in conventional engines. The energy imparted to the flywheel 26 on the crankshaft is utilized to return the pistons back up into the cylinders in position for the next power stroke or detonation. Since the crankshaft rotates at the same speed as the power output shaft and at the same frequency as the pistons, the connection between connecting rods and the crank of the crankshaft is simple and inexpensive and the crankshaft can be used to drive a camshaft for engine timing purposes.

Another advantage inherent in this arrangement is that when the engine drive shaft is rotating at a higher rotational speed than gear 28 when it rotates in the clockwise direction (power down-stroke of the pistons) the ratchet teeth cannot enter the recesses 32 in the gear 28. Consequently, the ratchet pinion and power output shaft are not connected to the engine pistons through the mechanical rectifier. With this arrangement, when, for example, the improved engine is installed in a motor vehicle, and if the motor vehicle is driven at high speeds, as in cross-country driving, removal of the driver's foot from the gas pedal has the effect of automatically putting the car in neutral giving the automobile a "free-wheeling" effect which is highly efficient. At lower speeds, however, as when the rotation speed of the power output shaft and the ratchet power 36 is less than the rotational speed of gear 28 when it rotates in the clockwise direction, the engine will be a drag on the power output shaft or transmission when the driver takes his foot off the gas. This arrangement is useful at lower speeds as when a car is driven in traffic because it saves wear on the brakes.

Having described this invention, what I claim new the following:

1. An engine of the class described comprising an engine block, at least one piston receiving cylinder formed in the engine block, a piston in each cylinder mounted for alternating rectilinear motion when the engine is operating, a downwardly extending piston rack secured to each piston, a power output shaft, said shaft rotatably mounted in bearings and adapted to be connected to an engine drive chain, a gear associated with each piston, each gear having a concentric generally circular opening extending therethrough defining thereby an outer peripheral surface and an inner peripheral surface surrounding said circular opening, gear teeth on the outer periphery of each gear disposed in uniformly spaced angular relationship to each other, said gear teeth meshing with teeth on said piston rack, whereby the alternating rectilinear motion of said piston causes said gear to rotate alternately first in one direction and then in an opposite direction, a plurality of radially extending uniformly spaced angularly disposed ratchet teeth receiving openings, one for each gear tooth, formed on said inner peripheral surface, a ratchet pinion for each gear rigidly mounted on said power output shaft in said concentric opening of said gear, a plurality of ratchet teeth, one for each radially extending opening in said gear, pivotally mounted on said ratchet pinion, wherein each of said ratchet teeth extends along a plane which intersects adjacent respective teeth of said gear teeth located closet to each of said ratchet teeth, means individually biasing each ratchet tooth in a direction such that they pivot towards an associated radially extending opening, a stop associated with each ratchet tooth to prevent the ratchet tooth from pivoting beyond a predetermined amount in said direction whereby the alternating reciprocal movement of the pistons when the engine is operating alternately rotates said gear first in one direction and then in an opposite direction, causing the ratchet teeth to pivot out of said radially extending openings when the gear rotates in its said opposite direction and prevents said ratchet teeth from pivoting out of said radially extending openings when the gear rotates in its said one direction so that alternating rotary motion of the gear causes the ratchet pinion to rotate in one direction whereby the power output shaft rotates in only one direction, said ratchet teeth having a size, shape and position on said ratchet pinion such that they remain out of power transmitting engagement with said inner peripheral surface of said gear whenever rotational speed of the power output shaft and pinion is greater than rotational speed of said gear in said one direction of said gear, so that if said engine is installed in a motor vehicle and the motor vehicle is driven at high speeds, the engine does not act as a drag on the motor vehicle when a driver releases pressure on a throttle of the engine to provide motor vehicle with an automatic free wheeling effect which only functions at higher speeds, a crankshaft rotatably mounted in bearings, a connecting rod pivotally secured at one end to a lower end of said piston rack and at another end to the crank of a crankshaft, and said crankshaft having a size, weight and shape such that a rotational energy imparted to the crankshaft returns each piston back into the cylinder in position in time for a next power stroke.

2. The engine described in claim No. 1 wherein said crankshaft rotates at a rotational speed same as the power output shaft and at a frequency same as the pistons.

* * * * *